March 3, 1953 M. O'SHEA 2,630,256
SUPPORT BRACKET
Filed March 11, 1950
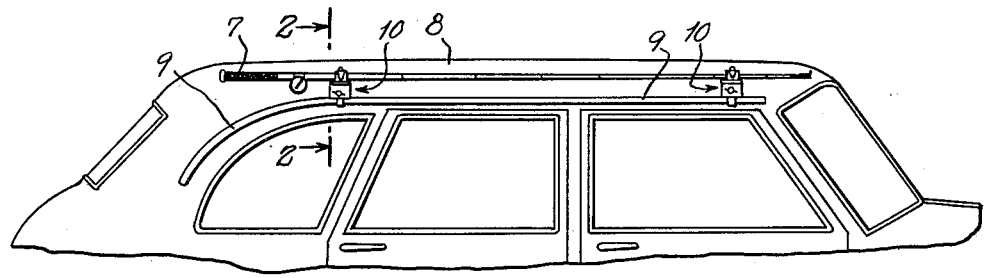
Fig. 1.
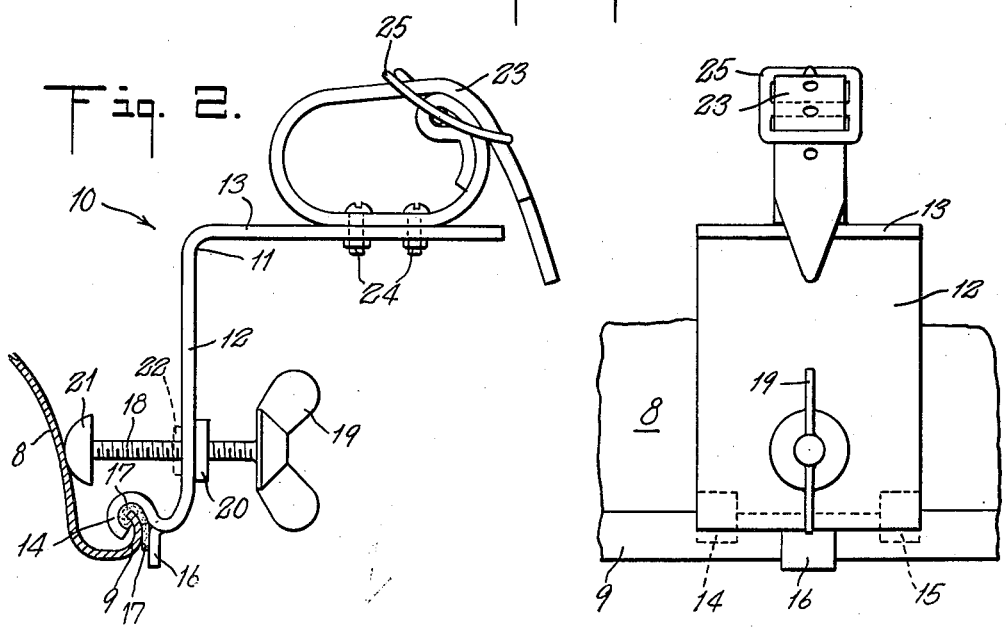
Fig. 2.
Fig. 3.
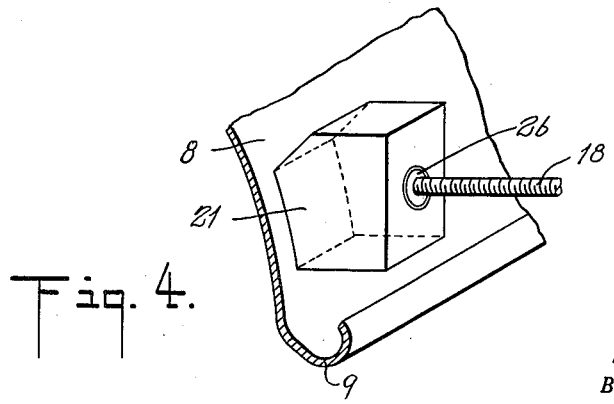
Fig. 4.
INVENTOR.
MAURICE O'SHEA
BY Kenyon & Kenyon
ATTORNEYS Patented Mar. 3, 1953

2,630,256

UNITED STATES PATENT OFFICE 2,630,256

SUPPORT BRACKET

Maurice O'Shea, Elmhurst, N. Y.

Application March 11, 1950, Serial No. 149,173

2 Claims. (Cl. 224—42.1)

This invention relates to improvements in support devices, and more particularly, to a device for supporting and carrying fishing poles, skis and the like on an automobile or similar vehicle.

In transporting fishing poles, skis and similar lengthy articles to and from the place of use, it is customary to tie them onto the top, sides, fenders or bumpers of an automobile, or to place them inside the automobile or its trunk, with the result that the articles usually are not safely secured and usually extend beyond the automobile so that they are likely to be damaged by or cause damage to structures with which they come into contact.

This invention provides an efficient, inexpensive and compact support bracket adapted for removable attachment to the gutter or drip trough which extends lengthwise along both sides of the top or roof of an automobile or similar vehicle.

One of the principal features of this invention is the provision of such a support bracket, which, when attached to the roof gutter of a vehicle, cannot be displaced therefrom accidentally and will not become loosened by vibration and movement of the vehicle.

Another feature of this invention is the provision of such a support bracket which is of light weight and sturdy construction, which requires no screws or bolts threaded into any portion of the automobile, but which may be securely mounted on the roof gutter of a vehicle, and which may be easily and readily attached thereto and removed therefrom.

A further feature of this invention is the provision of such a support bracket adapted to be suspended and supported on a roof gutter of a vehicle by hanger and brace means.

A further feature of this invention is the provision of such a support bracket adapted to be mounted on the roof gutter of a vehicle in such a manner that the articles to be carried by the bracket will be disposed closely adjacent the roof of the vehicle and in non-obstructing position for its normal use.

Another feature of this invention is the provision of such a support bracket adapted to be mounted on the roof gutter of a vehicle with the center of gravity of the bracket disposed so as to assist in securing and retaining the device on the gutter.

These and other features and advantages of the device of this invention will become apparent from the following description of the embodiment shown in the accompanying drawings, in which:

Fig. 1 shows a pair of support brackets constructed in accordance with this invention, attached to the roof gutter of an automobile, and supporting a fishing pole;

Fig. 2 is an end elevational view of one of the support brackets shown in Fig. 1, the view being taken along the line 2—2 of Fig. 1;

Fig. 3 is an enlarged front elevational view of one of the support brackets as shown in Fig. 1; and Fig. 4 shows in perspective a modification of the roof-engaging block and the associated brace screw.

Referring particularly to Fig. 1, a pair of support brackets constructed in accordance with this invention may be attached to one of the gutters or drip troughs 9 which extend along each side of the vehicle roof 8, and so that a fishing pole 7 or other similar lengthy article may be strapped to the brackets and supported and carried in a position lengthwise of the vehicle and closely adjacent its roof.

Referring more particularly to Figs. 2 and 3, the support bracket 10 comprises an angle member 11 having two angularly arranged flanges 12 and 13. The lower or free end of flange 12 is cut away and formed to provide at each side a curved hanger lip 14, 15 and a spaced braced lip 16 extending down between spaced lips 14, 15. Lips 14, 15 are suitably curved so that they are adapted to be hung or suspended over the edge of the gutter 9 on the vehicle roof and so that brace lip 16 is pressing against the outer surface of the gutter. With this arrangement of lips 14, 15, 16, they cooperate to suspend and support the bracket on the gutter. To prevent scratching or marring the gutter, a layer 17 of relatively soft resilient material such as gasket rubber, sponge rubber or the like is advantageously affixed, as by adhesive cement, to the surfaces of lips 14, 15 and 16, which are next adjacent the gutter.

In order to securely brace the support bracket in position on the gutter, a screw 18 provided at one end with flanged finger grips 19 passes through a threaded boss 20 which is attached as by welding to flange 12 adjacent the lower end thereof. A block 21 of semi-hard rubber or other suitably resilient material is mounted on the inner end of screw 18 and is adapted to be forced into engagement with the vehicle roof adjacent gutter 9. It will be apparent that with hanger lips 14, 15 suspended over the edge of gutter 9, angle member 11 will be suspended and supported on the gutter, and with brace lip 16 pressing against the outer surface of the gutter, the angle member will be prevented from tipping away from the vehicle roof. By adjusting screw 18 so as to force block 21 into engagement with the vehicle roof, the support bracket will be firmly braced against and prevented from tipping toward the vehicle roof.

The resilient block 21 and the layers of resilient material 17 on the hanger and brace lips absorb the vibrations of the automobile so that the bracket 10 will not become loosened. If desired, a lock nut such as shown at 22 in Fig. 2 may be employed on screw 18 to lock the screw relative to angle member 11 in the position in which block 21 is firmly engaged with the vehicle roof.

As shown in Figs. 1–3, flange 13 of angle member 11 is advantageously arranged relative to flange 12 so that with hanger lips 14, 15 suspended over the gutter 9, the center of gravity of the support unit will be positoned laterally away from the vehicle. With this arrangement, the bracket will tend to tip away from the vehicle roof, resulting in hanger lips 14, 15 and brace lip 16 being pressed more firmly against the surface of the gutter which they engage. When the bracket is loaded, as shown in Fig. 1, the weight of the article carried thereby assists in tending to tip the bracket away from the vehicle roof so that the bracket is more firmly engaged with the gutter 9. If desired, however, flange 13 may be arranged relative to flange 12 so as to extend toward and over the roof of the vehicle. With such an arrangement, neither the support bracket nor the articles to be carried thereby will extend beyond the side of the vehicle even to the small extent shown in Fig. 2, and the brace provided by screw 18 and block 21 will prevent the bracket from tipping toward the vehicle roof even when loaded.

The flange 13 has an adjustable strap 23 fastened thereto, as by means of rivets or bolts 24, for securing to the support bracket the articles to be carried thereby. The strap is advantageously fastened to flange 13 by locating the rivets or bolts adjacent the loop by which the buckle 25 is attached to the strap, and with the buckle disposed nearest the outer end of flange 13.

As shown in Fig. 4, the block 21 may be attached to screw 18 as by means of a socket member 26 secured in the block and with screw 18 swivelly connected thereto. As shown in this modification, the face of block 21 which engages the automobile roof is advantageously concave so as to assure uniform gripping contact of the block with the curved roof of the vehicle as the block is forced into engagement therewith.

The foregoing detailed description of the device of this invention and of the modifications of the embodiments shown in the drawings is merely for the purpose of illustration, and it will be understood that various modifications and applications of the invention may be made without departing from the scope of the appended claims.

I claim:

1. A support bracket adapted for removable attachment to the roof gutter of a vehicle, comprising an angle member having two angularly disposed flanges, strap securing means attached to one of said flanges and the other of said flanges having at its free end a pair of spaced hanger lips and a brace lip disposed between said hanger lips, said hanger lips being adapted to be suspended over the edge of said gutter with said brace lip pressing against the outer surface of said gutter, said hanger and brace lips cooperating to suspend and support the bracket on said gutter, a screw threadedly connected to said angle member adjacent said hanger lips, and a block mounted on one end of said screw and adapted to be forced against the roof of the vehicle adjacent said gutter by adjustment of said screw to brace the bracket against the vehicle roof, the surface of said block engaged with the roof of the vehicle being formed concavely to correspond substantially to the curvature of the vehicle roof.

2. A support bracket adapted for removable attachment to the roof gutter of a vehicle, comprising an angle member having two angularly disposed flanges, strap securing means attached to one of said flanges and the other of said flanges having at its free end a pair of spaced hanger lips and a brace lip disposed between said hanger lips, said hanger lips being adapted to be suspended over the edge of said gutter with said brace lip pressing against the outer surface of said gutter, said hanger and brace lips cooperating to suspend and support the bracket on said gutter, a screw threadedly connected to said angle member adjacent said hanger lips, and a block mounted by a swivel connection on one end of said screw and adapted to be forced against the roof of the vehicle adjacent said gutter by adjustment of said screw to brace the bracket against the vehicle roof.

MAURICE O'SHEA.

REFERENCES CITED

The following references are of record in the file of this patent:

UNITED STATES PATENTS

| Number | Name | Date |
| --- | --- | --- |
| 2,461,897 | Hopkins | Feb. 15, 1949 |
| 2,508,527 | Martin et al. | May 23, 1950 |
| 2,514,266 | Walslager | July 4, 1950 |
| 2,522,174 | Hermsmeyer | Sept. 12, 1950 |
| 2,528,794 | Seidler | Nov. 7, 1950 |
| 2,529,285 | Felton | Nov. 7, 1950 |